(12) United States Patent
Miyagi et al.

(10) Patent No.: US 11,393,360 B2
(45) Date of Patent: Jul. 19, 2022

(54) SKILL TRAINING DEVICE AND SKILL TRAINING METHOD (71) Applicant: HITACHI, LTD., Tokyo (JP)

(72) Inventors: Masanori Miyagi, Tokyo (JP); Akihide Tanaka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/258,301

(22) PCT Filed: Mar. 4, 2019

(86) PCT No.: PCT/JP2019/008315
§ 371 (c)(1),
(2) Date: Jan. 6, 2021

(87) PCT Pub. No.: WO2020/012701
PCT Pub. Date: Jan. 16, 2020

(65) Prior Publication Data
US 2021/0142693 A1    May 13, 2021

(30) Foreign Application Priority Data

Jul. 13, 2018  (JP) .............................. JP2018-132911

(51) Int. Cl.
*G09B 19/24*  (2006.01)
*B23K 9/095*  (2006.01)
(Continued)

(52) U.S. Cl.
CPC .............. *G09B 19/24* (2013.01); *B23K 9/095* (2013.01); *B23K 9/32* (2013.01); *B23K 31/125* (2013.01); *G06V 40/20* (2022.01)

(58) Field of Classification Search
CPC ....... B23K 9/095; B23K 9/0953; G09B 19/24
See application file for complete search history.

(56) References Cited

U.S. PATENT DOCUMENTS

2014/0134579 A1    5/2014  Becker
2016/0267806 A1*   9/2016  Hsu ...................... B23K 9/0956
(Continued)

FOREIGN PATENT DOCUMENTS

JP    2001-171140 A    6/2001
JP    2005-134536 A    5/2005
(Continued)

OTHER PUBLICATIONS

International Search Report, PCT/JP2019/008315 dated Apr. 23, 2019, 2 pgs.

*Primary Examiner* — Robert J Utama
(74) *Attorney, Agent, or Firm* — Volpe Koenig (57) ABSTRACT A control device includes a storage unit that stores motion assessment index information for mapping a normal range for doing work motion to associated knowledge about the normal range, a motion information detection unit that detects motion information which is the result of measuring motion of a trainee, a motion determination unit that determines whether or not the motion information detected by the motion information detection unit deviates from the normal range stored in the storage unit, and a notification unit that acquires from the storage unit the associated knowledge mapped to the normal range from which the motion determination unit determines that the motion information deviates, and gives notice of the associated knowledge.

6 Claims, 5 Drawing Sheets (51) Int. Cl.
    *B23K 9/32*        (2006.01)
    *B23K 31/12*     (2006.01)
    *G06V 40/20*    (2022.01)

(56) References Cited

U.S. PATENT DOCUMENTS

| | | | |
|---|---|---|---|
| 2017/0200394 A1* | 7/2017 | Albrecht | ................ G09B 9/00 |
| 2018/0130226 A1 | 5/2018 | Meess et al. | |

FOREIGN PATENT DOCUMENTS

| | | |
|---|---|---|
| JP | 2006-010805 A | 1/2006 |
| JP | 2009-069954 A | 4/2009 |
| JP | 2013-156428 A | 8/2013 |
| JP | 2015-225214 A | 12/2015 |
| JP | 2018-010310 A | 1/2018 |
| JP | 2018-081093 A | 5/2018 |

* cited by examiner

SKILL TRAINING DEVICE AND SKILL TRAINING METHOD

TECHNICAL FIELD

The present invention relates to a skill training device and a skill training method.

BACKGROUND ART

The environment for manufacturing has changed significantly due to the recent social situation. Due to an increase in overseas production, an increase in products procured from overseas, a decrease in skilled workers, and the like, it has become difficult to maintain manufacturing skills, and quality control faces a more severe situation. As a method of handing down the skills up to now, the skills have been succeeded through direct teaching by a skilled worker.

However, since the means to convey the skills is not enough and is often intuitive teaching, it takes time for teaching and the skills are conveyed inaccurately. Therefore, the skills are not completely transmitted and there is fear that the skills will be lost.

In contrast, with the recent development of measurement technique, attempts are being made to measure and evaluate skilled skills. For example, attempts have been made to measure and evaluate work of a subject by using various measurement devices. A method of evaluating the quality of measured data by comparing the measured data with data measured in the past, and using the evaluation for quality control and training of welding work is proposed.

PTL 1 proposes a technique of training skills by acquiring motion of a trainee in three-dimensional coordinates and quantitatively expressing the motion.

CITATION LIST

Patent Literature

PTL 1: JP 2001-171140 A

SUMMARY OF INVENTION

Technical Problem

Note that in order to convey skills from an expert to a beginner, presenting to the user appropriate associated knowledge about the current motion of the beginner in a timely manner is more helpful for essential understanding than simply showing know-how in a teaching material video or the like. For example, the learning efficiency of a trainee is improved by displaying know-how of the motion which is currently a weak point, without displaying the know-how that has been already mastered.

However, the conventional techniques such as PTL 1 simply parameterize the current motion of a trainee into numerical values, and are not suitable for the purpose of skill training for efficiently conveying know-how of skills.

Therefore, a main object of the present invention is to support efficient skill acquisition by presenting knowledge associated with motion of a trainee.

Solution to Problem

In order to solve the above-described problem, a skill training device of the present invention has the following features.

The present invention includes a storage unit that stores motion assessment index information for mapping a normal range for doing work motion to associated knowledge about the normal range, a motion information detection unit that detects motion information which is the result of measuring motion of a trainee, a motion determination unit that determines whether or not the motion information detected by the motion information detection unit deviates from the normal range stored in the storage unit, and a notification unit that acquires from the storage unit the associated knowledge mapped to the normal range from which the motion determination unit determines that the motion information deviates, and gives notice of the associated knowledge.

Other means will be described later.

Advantageous Effects of Invention

According to the present invention, efficient skill acquisition can be supported by presenting knowledge associated with motion of a trainee.

DESCRIPTION OF EMBODIMENTS

Hereinafter, an embodiment of the present invention will be described in detail with reference to the drawings.

Figure 1:
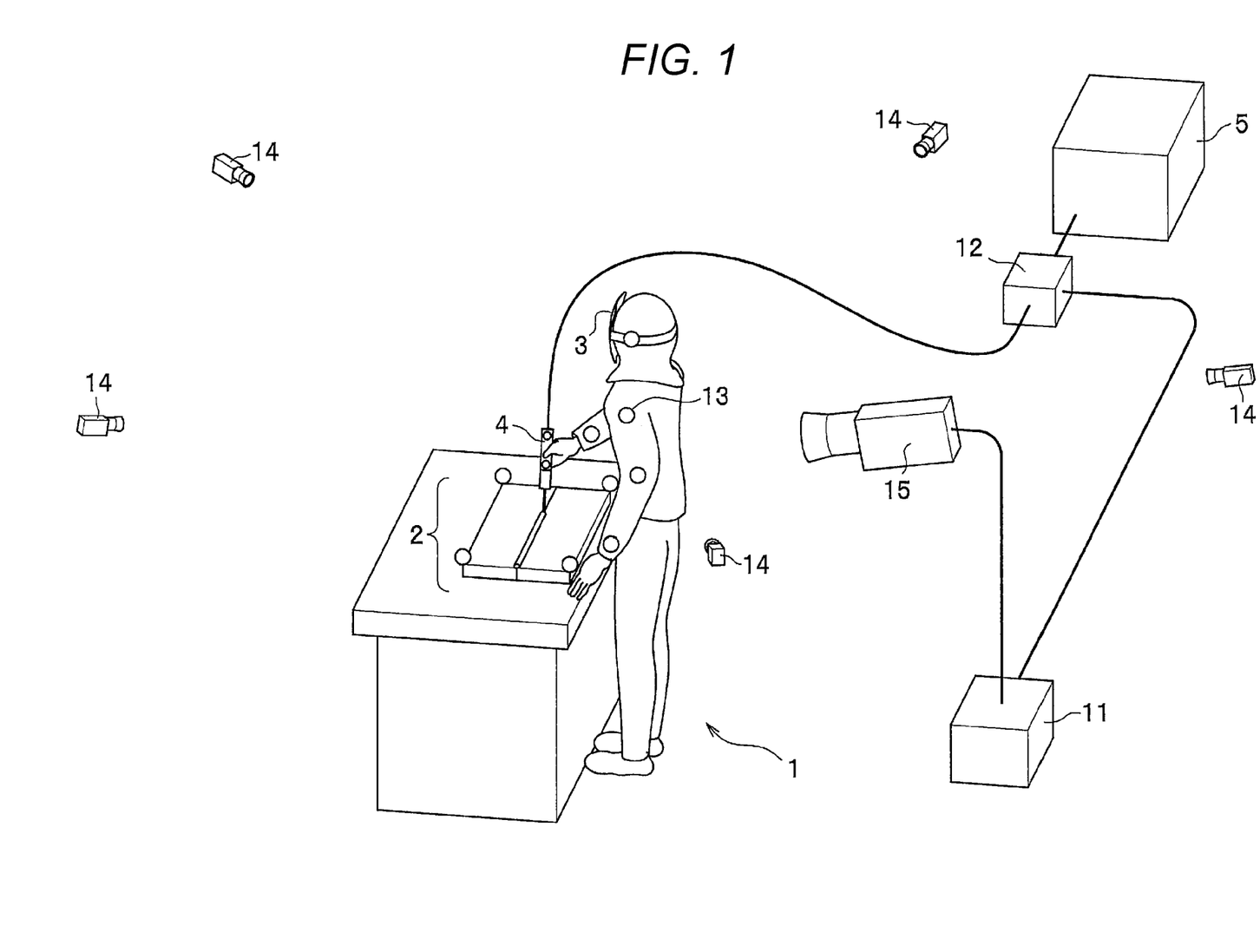
FIG. 1 is an overall view illustrating a skill training system according to an embodiment of the present invention.

FIG. 1 illustrates an overall view of a skill training system.

The skill training system trains the skill of welding by measuring motion of a welder 1 who is a trainee. Note that skills to be trained are not only welding but also any work motion such as brazing, painting, grinder, polishing, and casting.

The welder 1 is a worker who semi-automatically welds a welding target 2. The welder 1 wears a light-shielding mask 3 on his or her face to protect the eyes from arc (light emission) from a welding wire 4b (FIG. 5), which is a front end portion of a torch 4 to be gripped.

The welding target 2 is for example, two plate-shaped base materials. By connecting these base materials with a welding material melted by heat generated by arc from the welding wire 4b, the two base materials are joined like one metal plate.

At a welding work site illustrated in FIG. 1, equipment for skill training is provided in addition to welding equipment. A control device (skill training device) 11 is connected to each of the measurement devices (a field of view video camera 15, marker measurement cameras 14, and an electrical measurement device 12), and controls operation of each of the measurement devices. Note that even though communication cables between the control device 11 and the five marker measurement cameras 14 are not illustrated, wireless communication or wired communication may be used as the communication means between the control device 11 and each of the marker measurement cameras 14.

A semi-automatic welding power source 5 supplies welding electric power to the torch 4. The electrical measurement device 12 measures a welding current and a welding voltage as electric power supplied by the semi-automatic welding power source 5.

The marker measurement cameras 14 are disposed around the welder 1 and the welding target 2. The marker measurement cameras 14 capture images of markers 13 disposed at various places in the work site, and acquire the positions of the respective markers 13 by using motion capture from the captured images. The markers 13 are attached to, for example, the welder 1, the light-shielding mask 3, the torch 4, the welding target 2 (spherical in the figure).

The field of view video camera 15 is a camera for capturing a field of view during welding as viewed from the welder 1. In FIG. 1, the field of view video camera 15 is disposed such that the imaging range thereof is from the imaging position behind the welder 1 to the area in front of the welder 1, as an example of the field of view of the field of view video camera 15.

Note that in a case where a welding target 2 is large and the field of view of the worker moves during welding, it is better to move the field of view video camera 15 so as to follow the field of view. Alternatively, the field of view video camera 15 may be attached to part of the body of the welder 1 (for example, on the light-shielding mask 3).

The skill training system illustrated in FIG. 1 described above is assumed to be used in an on-site field training in which welding training is performed by actually emitting arc light. In contrast, a similar function can be provided also in a virtual training system. At that time, the welder 1 wears a head mounted display instead of wearing the light-shielding mask 3 on the face.

Then, motion information of the welder 1 may be measured by a gyro sensor or the like mounted on the head mounted display. Furthermore, the state of the skill according to training motion may be displayed in a simulated manner on the head mounted display.

Figure 2:
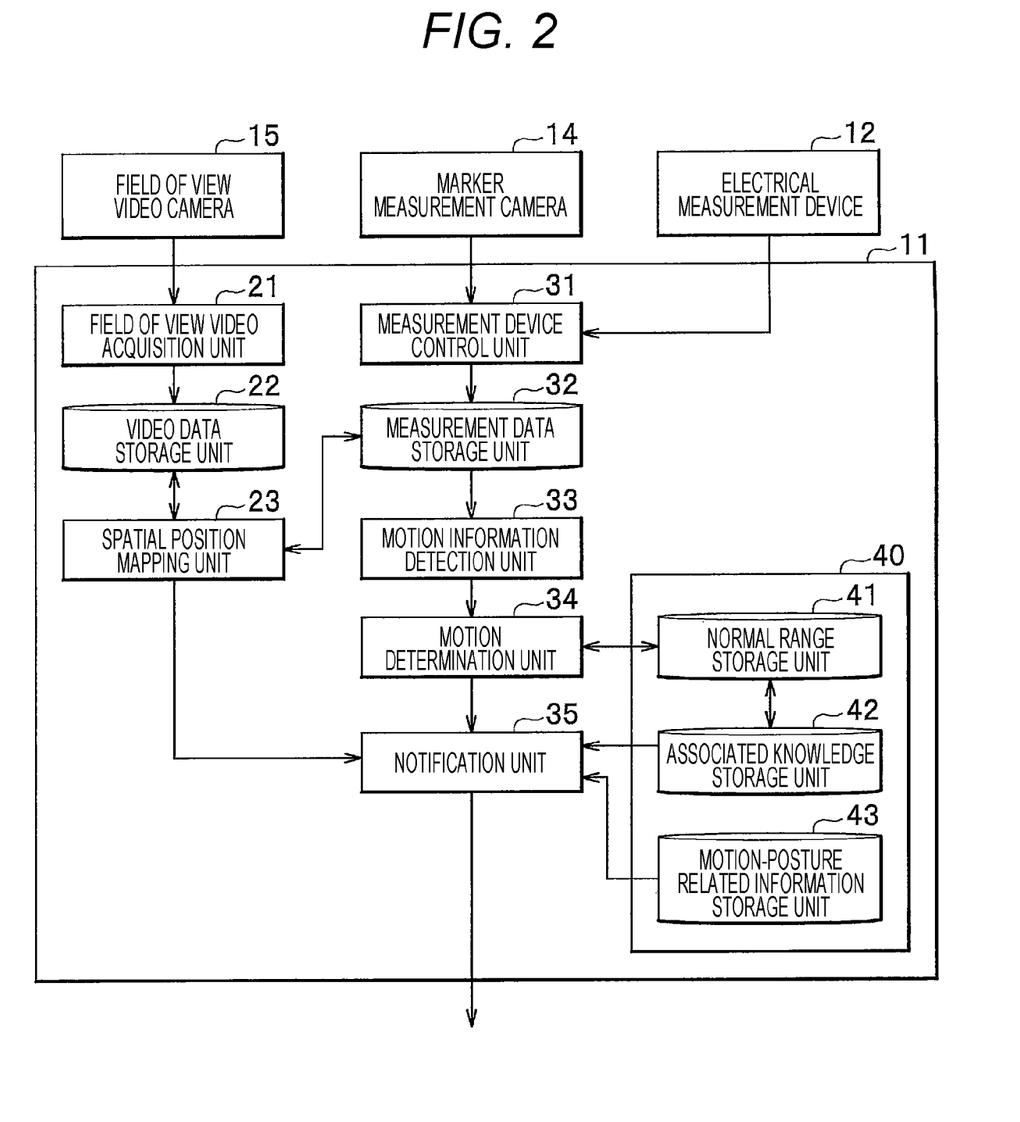
FIG. 2 is a configuration diagram illustrating details of a control device according to the embodiment of the present invention.

FIG. 2 is a configuration diagram illustrating details of the control device 11. The control device 11 is configured as a computer including a CPU (Central Processing Unit), a memory, storage means (storage unit) such as a hard disk, and a network interface.

In this computer, the CPU executes a program (also referred to as an application or app, which is an abbreviation for application) loaded into the memory to operate a control unit (control means) configured of each processing unit.

The control device 11 includes a field of view video acquisition unit 21, a video data storage unit 22, a spatial position mapping unit 23, a measurement device control unit 31, a measurement data storage unit 32, a motion information detection unit 33, a motion determination unit 34, a notification unit 35, and a storage unit 40. The storage unit 40 stores motion assessment index information in which a normal range stored in a normal range storage unit 41, associated knowledge stored in an associated knowledge storage unit 42, and motion-posture related information stored in a motion-posture related information storage unit 43 are mapped to one another.

The field of view video acquisition unit 21 acquires the field of view video of the welder 1 which is the measurement data of the field of view video camera 15, and stores the field of view video in the video data storage unit 22.

The measurement device control unit 31 receives measurement data examples of which are described below from each measurement device, and stores the measurement data in the measurement data storage unit 32 as accumulated data.

As the measurement data of the torch 4 obtained by the marker measurement cameras 14, the height of the torch 4, the angle of the torch 4, the angle of the elbow that holds the torch 4

As the measurement data of the welding wire 4b obtained by the marker measurement cameras 14, the average moving speed, the weaving condition, the amount of filler material supplied As the measurement data of the light-shielding mask 3 obtained by the marker measurement cameras 14, the position of the head of the welder 1, and the like As the measurement data of the electrical measurement device 12, welding condition data such as a current value and a voltage value Note that measurement data obtained by a measurement device is not limited to visual information (video), and may be auditory information (sound) and tactile information (heat, pressure).

The spatial position mapping unit 23 maps the spatial position (three-dimensional position) in the field of view image data of the video data storage unit 22 to the spatial position (three-dimensional position) in the measurement data of the measurement data storage unit 32 in the field of view of the field of view image data. As a result of this mapping process, it can be seen that a certain target exists at the same time and at the same location in the field of view video data of the video data storage unit 22 and the measurement data of the measurement data storage unit 32 in the field of view of the field of view image data. As a result, measurement data such as the weaving width can be combined to and displayed on the field of view video data.

The motion information detection unit 33 detects motion information of the welder 1 on the basis of the measurement data stored in the measurement data storage unit 32. The motion information detection unit 33 is realized as, for example, motion capture using the markers 13, an acceleration/angular velocity/geomagnetic measurement device, a global positioning system (GPS), an indoor global positioning system (indoor GPS), or a stereo camera. Note that since the field of view video acquisition unit 21 operates in synchronization with the motion information detection unit 33, the motion information detection unit 33 can map motion of the welder 1 to the field of view video of the welder 1.

On the basis of motion information detected by the motion information detection unit 33 and the normal range stored in the normal range storage unit 41, the motion determination unit 34 determines the associated knowledge stored in the associated knowledge storage unit 42 and motion-posture related information stored in the motion-posture related information storage unit 43 to be output to the notification unit 35.

Figure 6:
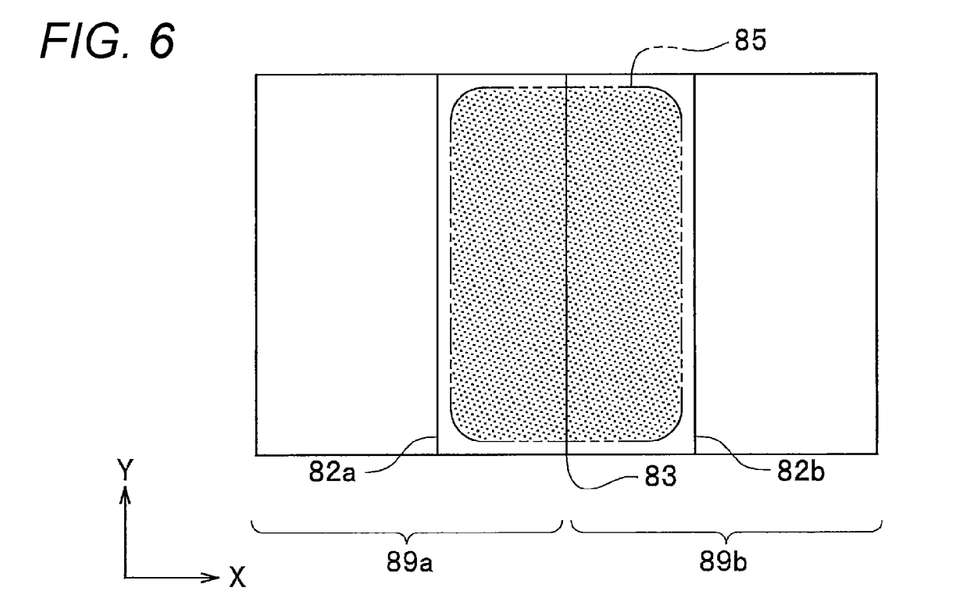
FIG. 6 is a plan view illustrating a normal range registered in advance in a normal range storage unit in the plan view of FIG. 5 according to the embodiment of the present invention.

The normal range stored in the normal range storage unit 41 is, for example, a movement range of the welding wire 4*b* of the torch 4 that moves on the welding target 2 while generating an arc (for details, refer to an normal range 85 in FIG. 6).

The associated knowledge storage unit 42 stores knowhow about the quality of skills, reasoning, theory, past cases, a focus point for motion assessment, and the like. The focus point for motion assessment is a guideline or a hint for assessing motion. For example, as a way of determining the weaving width during welding, welding knowledge such as "weave until the positions of the wire and the groove match" (see FIG. 7 for details) is stored in the associated knowledge storage unit 42.

The motion-posture related information storage unit 43 stores data of appropriate postures for the welder 1 to execute certain motion. Proper posture data such as a stable model posture and a model posture with less fatigue are registered in advance in the motion-posture related information storage unit 43. As parameters of the posture data, for example, in weaving motion during welding, the position and the angle of the head, the position and the angle of the arm, the position and the angle of the elbow, the position and the angle of the waist, and the position and the angle of the foot are important.

The notification unit 35 notifies the user such as the welder 1 of associated knowledge associated with the motion information determined by the motion determination unit 34 and motion-posture related information by means of screen display, voice output, or the like. The user to be notified here is not limited to the welder 1 himself or herself who is a trainee, and may be other workers and their supervisor in the same workplace where the welder 1 exists and a training listener in a room separate from the workplace.

Note that the notification unit 35 may further combine the information to be notified described above and the field of view video data mapped by the spatial position mapping unit 23, and may give notice of the combined information. That is, pieces of information (normal range, associated knowledge, motion-posture related information) stored in the storage unit 40 are combined and displayed in the field of view video of the welder 1.

Thus, the user such as the welder 1 can immediately correct work appropriately by checking the improvement proposal combined in real time. That is, even in a case where motion of the welder 1 changes continuously, showing the combined display described above to the user such as the welder 1 enables the user to grasp the focus point of motion assessment, the normal range, and the like. Note that the output destination of the combined display may be the head mounted display worn by the trainee.

The outline of the skill training system has been described above with reference to FIGS. 1 and 2. Hereinafter, a specific example in which the skill training system supports the welder 1 at an actual welding site will be described with reference to FIGS. 3 to 7.

Figure 3:
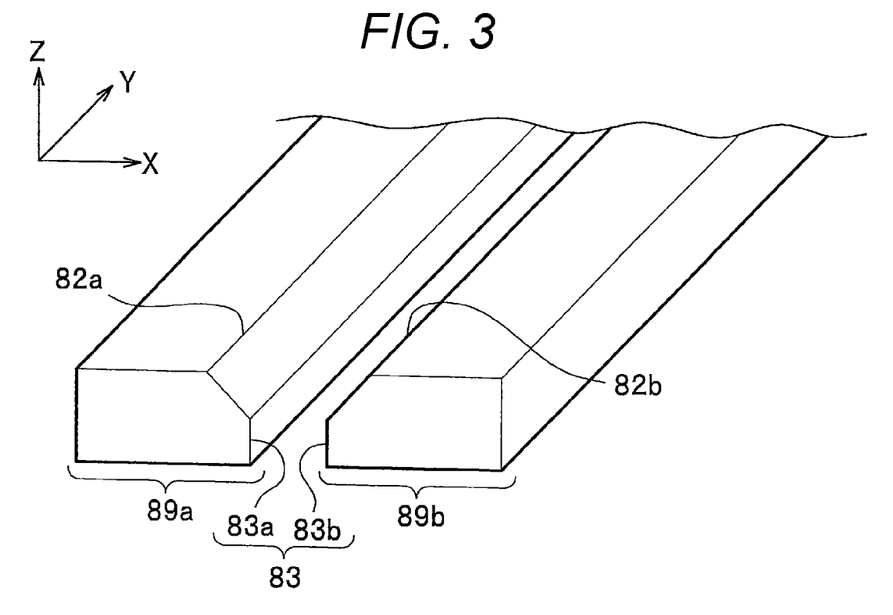
FIG. 3 is a perspective view illustrating a welding target before being welded according to the embodiment of the present invention.

FIG. 3 is a perspective view illustrating the welding target 2 before being welded.

Figure 4:
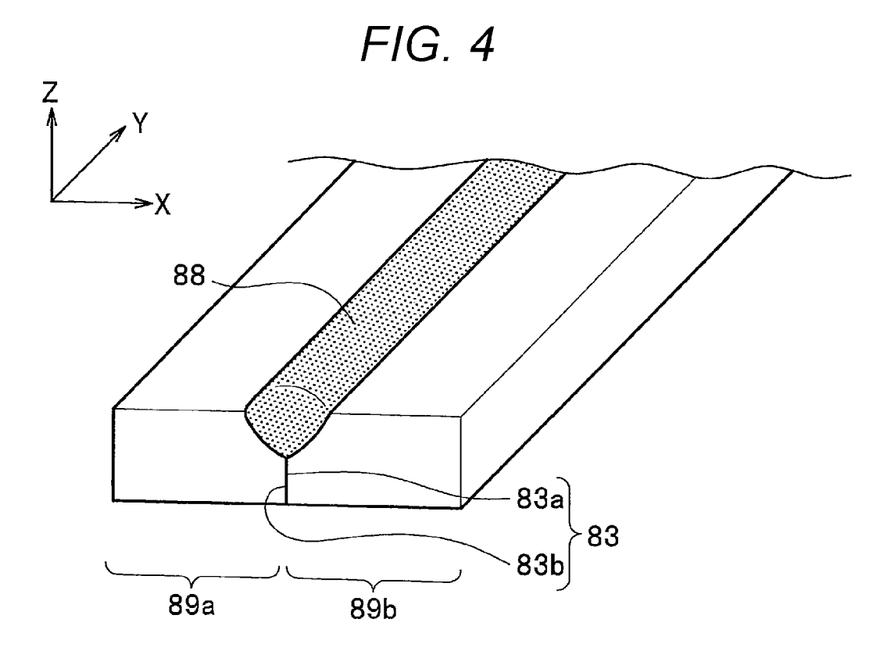
FIG. 4 is a perspective view illustrating the welding target after having been welded according to the embodiment of the present invention.

FIG. 4 is a perspective view illustrating the welding target 2 after being welded.

The welding target 2 is a combination of a left base material 89*a* and a right base material 89*b*. An abutting portion 83*a*, which is an end portion of the base material 89*a* in the X-axis+direction, and an abutting portion 83*b*, which is an end portion of the base material 89*b* in the X-axis-direction, are in close contact with each other as an abutting portion 83.

An groove end portion 82*a* of the base material 89*a* in the Z-axis+direction and an groove end portion 82*b* of the base material 89*b* in the Z-axis+direction are separated from each other by a certain distance even in a state where the base materials are in close contact with each other. A bead 88, which is a welding material, is poured into the space with the certain distance, and therefore the two base materials are welded.

Figure 5:
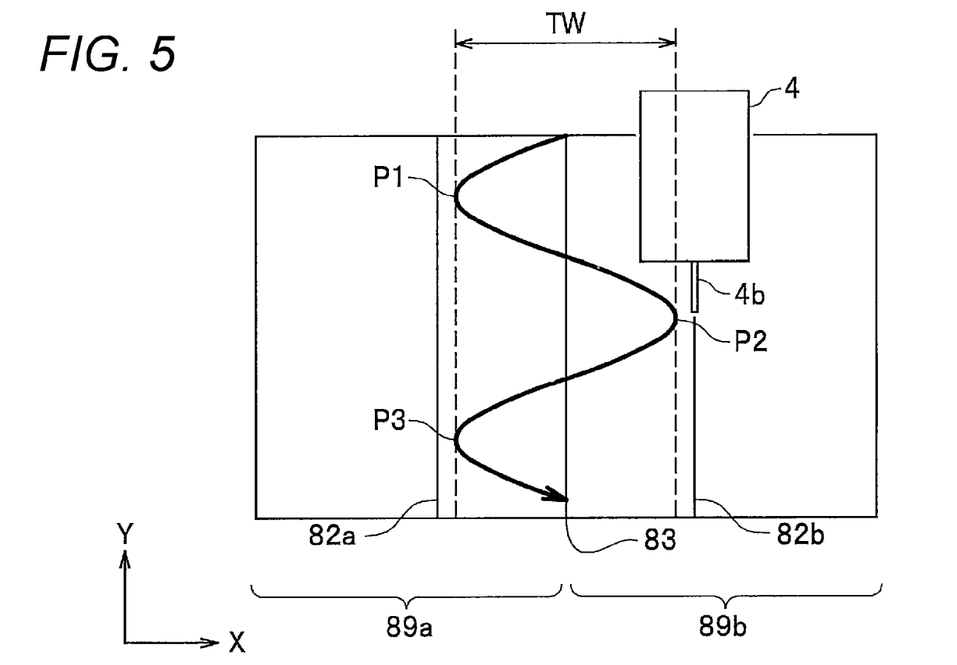
FIG. 5 is a plan view of base materials of FIG. 4 according to the embodiment of the present invention as viewed from above.

FIG. 5 is a plan view of the base materials 89*a* and 89*b* of FIG. 4 viewed from above (Z-axis+direction). The welder 1 moves the welding wire 4*b* of the torch 4 such that the welding wire 4*b* moves in the Y-axis-direction while meandering (weaving) from the Y-axis+direction. The weaving locus at a front end portion of the welding wire 4*b* is indicated by an arrow. The weaving locus makes a turn at three points during movement, as indicated by turning points P1, P2, and P3.

A weaving width TW is defined as the width of the weaving locus from the minimum value in the X-axis-direction (that is, the turning points P1, P3) to the maximum value in the X-axis+direction (that is, the turning point P2).

The motion information detection unit 33 tracks the weaving locus and the weaving width TW with reference to the measurement data of the marker 13 attached to the torch 4, and the like.

FIG. 6 is a plan view illustrating a normal range registered in advance in the normal range storage unit 41 in the plan view of FIG. 5.

The normal range 85 is a welding range for injecting the welding material into the welding target 2, and is registered as a substantially rectangular shape based on the X-axis width from the groove end portion 82*a* to the groove end portion 82*b* and the Y-axis length of each of the base materials 89*a*, 89*b*. That is, it can be said that it is proper work to let the welder 1 form a weaving locus so that the bead 88 of the welding wire 4*b* can be poured into the normal range 85.

In contrast, by decreasing the X-axis width of the normal range 85 toward the abutting portion 83 from the X-axis width in FIG. 6, it is possible to display associated knowledge before the weaving locus crosses the groove end portion 82*a* or the groove end portion 82*b*.

Figure 7:
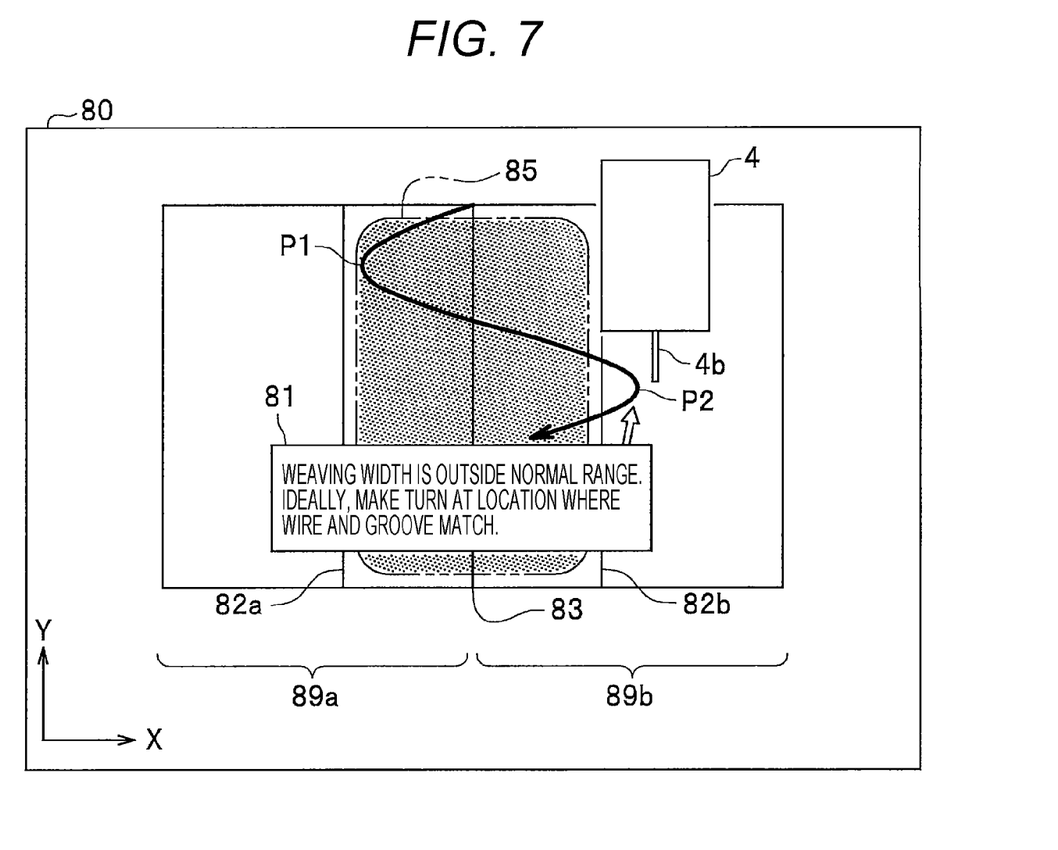
FIG. 7 is an example of a screen displaying associated knowledge on the basis of the normal range defined in the plan view of FIG. 6 according to the embodiment of the present invention.

FIG. 7 is an example of a screen displaying associated knowledge on the basis of the normal range 85 defined in the plan view of FIG. 6.

Similarly to FIG. 5, a weaving locus detected by the motion information detection unit 33 is displayed as an meandering arrow on a display 80. However, in FIG. 7, a second turning point P2 is located outside the normal range 85.

Here, the motion determination unit 34 detects that the weaving locus deviates from the normal range 85. Then, the notification unit 35 displays associated knowledge display 81 "weave until the position of the wire and the position of the groove match" as the associated knowledge stored in the associated knowledge storage unit 42 mapped to the normal range 85. In other words, since proper work has been performed until the weaving locus deviates from the normal range 85, display of the associated knowledge display 81 may be omitted.

Furthermore, in the associated knowledge display 81, in addition to the character string indicating the content of the associated knowledge, position information such as an arrow pointing to the turning point P2 in FIG. 7, the position information indicating in which part the associated knowledge is applied, may be displayed.

Furthermore, when the weaving locus deviates from the normal range 85, the motion determination unit 34 may also determine the posture of the welder 1 when the weaving locus is drawn.

For example, the posture in which "elbow height is 15 cm below the shoulder height" is set as a model posture for weaving motion, and "the range in which the elbow height is within ±5 cm from the height which is 15 cm below the shoulder height" is registered in advance as the posture normal range of the normal range storage unit 41. Then, in a case where the posture of the welder 1 deviates from the posture normal range, the motion determination unit 34 can notify the welder 1 of difference information with respect to the model posture as an improvement proposal through the notification unit 35.

In the present embodiment as described above, on the basis of motion information detected by the motion information detection unit 33 and the normal range stored in the normal range storage unit 41, the motion determination unit 34 determines the associated knowledge stored in the associated knowledge storage unit 42 and motion-posture related information stored in the motion-posture related information storage unit 43 to be output to the notification unit 35.

As a result, by presenting appropriate associated knowledge about the current motion of the welder 1 in a timely manner, unacquired know-how can be essentially understood.

Furthermore, by combining associated knowledge output by the notification unit 35 with field of view video of the field of view video camera 15, the normal range 85 such as a turning point of weaving, the associated knowledge display 81 thereof, as illustrated in FIG. 7 can be displayed at appropriate locations by using three-dimensional spatial coordinates.

Note that the present invention is not limited to the above-described embodiment, but includes various modifications. For example, the above-described embodiment is described in detail for easy understanding of the present invention, and the present invention is not necessarily limited to those having all the configurations described above.

Furthermore, part of the configuration of one embodiment can be replaced with the configuration of another embodiment, and the configuration of one embodiment can be added to the configuration of another embodiment.

Furthermore, it is possible to add, delete, or replace another configuration to, from, or with part of the configuration of each embodiment. In addition, each of the above-described configurations, functions, processing units, processing means, and the like may be partially or entirely realized by hardware, for example, by designing hardware with an integrated circuit.

Furthermore, the above-described respective configurations, functions, and the like may be realized by software causing a processor to interpret and execute a program for realizing the respective functions.

Information of a program, a table, a file, and the like for realizing the respective functions can be placed in a recording device such as a memory, a hard disk, or an SSD (Solid State Drive), or a recording medium such as an IC (Integrated Circuit) card, an SD card, or a DVD (Digital Versatile Disc).

Furthermore, control lines and information lines indicate those considered necessary for the description, and do not necessarily indicate all the control lines and information lines necessary for a product. In fact, it can be considered that almost all components are interconnected.

Furthermore, the communication means for connecting the respective devices is not limited to a wireless LAN, and may be changed to a wired LAN or other communication means.

REFERENCE SIGNS LIST 1 welder
2 welding target
3 light-shielding mask
4 torch
4b welding wire
5 semi-automatic welding power source
11 control device (skill training device)
12 electrical measurement device
13 marker
14 marker measurement camera
15 field of view video camera
21 field of view video acquisition unit
22 video data storage unit
23 spatial position mapping unit
31 measurement device control unit
32 measurement data storage unit
33 motion information detection unit
34 motion determination unit
35 notification unit
40 storage unit
41 normal range storage unit
42 associated knowledge storage unit
43 motion-posture related information storage unit
80 display
81 associated knowledge display
82 groove end portion
83 abutting portion
85 normal range
88 bead
89 base material

The invention claimed is:

1. A skill training device comprising:
    a memory that stores motion assessment index information for mapping a normal range for doing work motion to associated knowledge about the normal range;
    a camera that detects motion information which is a result of measuring motion of a trainee; and
    a processor communicatively coupled to the memory and the camera, wherein the processor is configured to:
    decrease the normal range to a smaller range;
    display, once the motion information is detected, an ideal path on the material for the trainee to follow based on the smaller range;
    determine an anticipated path of the trainee based on the motion information detected;
    determine if the anticipated path deviates from the smaller range; and
    display a first alert on the material that the anticipated path will deviate from the ideal path if the anticipated path is not changed.

2. The skill training device according to claim 1, wherein posture information obtained when work motion is performed is also mapped to the motion assessment index information, and
    alerts the trainee of the posture information mapped to the normal range from which the motion determination unit determines that the motion information deviates, when the first alert is displayed.

3. The skill training device according to claim 1, wherein the processor gives notice of combined display of field of view video during motion of the trainee and the associated knowledge mapped to the normal range from which the motion information deviates, when the first alert is displayed.

4. The skill training device according to claim 3, wherein the processor sets an output destination of the combined display to a head mounted display worn by the trainee.

5. The skill training device according to claim 1, wherein in the memory, a welding range for injecting a welding material into a welding target is defined as the normal range for performing work motion, and welding knowledge indicating that a welding tool is moved such that a locus of the welding tool is located within the welding range is defined as the associated knowledge mapped to the welding range, and
the gives a second alert of the welding knowledge when the welding tool gripped by the trainee deviates from the welding range.

6. A skill training method wherein a skill training device includes a memory, a camera, and a processor, the skill training method comprising:
    storing, motion assessment index information for mapping a normal range for doing work motion to associated knowledge about the normal range;
    detecting, motion information which is a result of measuring motion of a trainee;
    decreasing the normal range to a smaller range;
    displaying, once the motion information is detected, an ideal path on the material for the trainee to follow based on the smaller range;
    determining an anticipated path of the trainee based on the motion information;
    determining if the anticipated path deviates from the smaller range; and
    displaying an alert on the material that the anticipated path will deviate from the ideal path if the anticipated path is not changed.

\* \* \* \* \*